United States Patent [19]
Huebler et al.

[11] Patent Number: 5,127,267
[45] Date of Patent: Jul. 7, 1992

[54] ACOUSTIC METHOD FOR LOCATING CONCEALED PIPE

[75] Inventors: James E. Huebler, Brookfield; Bruce K. Campbell, Chicago, both of Ill.

[73] Assignee: Southern California Gas Company, Los Angeles, Calif.

[21] Appl. No.: 643,572

[22] Filed: Jan. 18, 1991

[51] Int. Cl.⁵ ............................................. G01S 3/808
[52] U.S. Cl. ............................... 73/584; 73/597; 73/40.5 A
[58] Field of Search ............ 73/592, 40.5 A, 579, 73/584, 597–598, 646, 596, 618, 865.8; 367/105, 122, 127

[56] References Cited

U.S. PATENT DOCUMENTS

| | | | |
|---|---|---|---|
| 3,055,209 | 9/1962 | Reid et al. | 73/592 |
| 3,170,152 | 2/1965 | Long | 73/40.5 A |
| 3,264,864 | 8/1966 | Reid et al. | 73/592 |
| 3,867,282 | 6/1976 | Young et al. | 343/5 NA |
| 4,013,905 | 3/1977 | Breneman et al. | 310/8.3 |
| 4,062,010 | 12/1977 | Young et al. | 343/5 NA |
| 4,172,382 | 10/1979 | Murphy et al. | 73/40.5 A |
| 4,372,151 | 2/1983 | Muraview et al. | 73/405 A |
| 4,457,163 | 7/1984 | Jackle | 73/40.5 A |
| 4,600,356 | 7/1986 | Bridges et al. | 414/69 U |
| 4,649,948 | 3/1987 | Hudson | 73/40.5 A |
| 4,858,462 | 8/1989 | Coulter et al. | 73/40.5 A |
| 4,911,012 | 3/1990 | Ziska | 73/584 |
| 5,036,497 | 7/1991 | Heitman | 73/584 |

FOREIGN PATENT DOCUMENTS 0238733 11/1985 Japan .

Primary Examiner—Hezron E. Williams
Assistant Examiner—Rose M. Finley
Attorney, Agent, or Firm—Speckman & Pauley

[57] ABSTRACT

A method for determining the location of a concealed pipe is disclosed. An identifiable acoustic signal is injected into the concealed pipe. The signal propagates along the interior length of the pipe. The signal is detected by an array of detectors positioned at varying distances from the pipe. The detected signal generates voltage outputs from the detectors to a signal processor. The "time-of-flight" of the acoustic signal from the point of generation to the point of detection is measured by the signal processor. The detector measuring the shortest "time-of-flight" is closest to the concealed pipe.

9 Claims, 1 Drawing Sheet

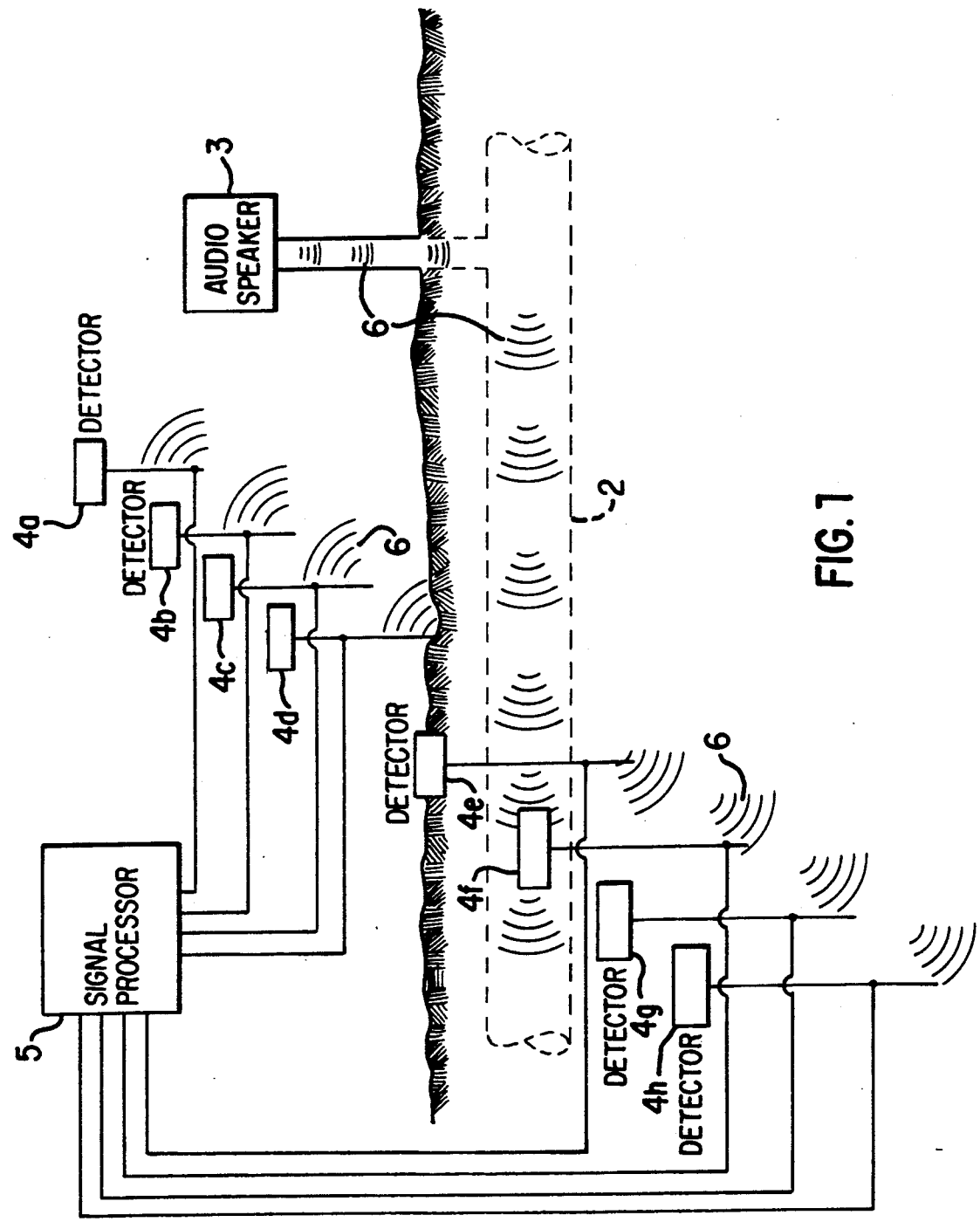

ACOUSTIC METHOD FOR LOCATING CONCEALED PIPE

BACKGROUND OF THE INVENTION

1. Field of the Invention

This invention relates to a method for locating concealed or buried pipe using the "time-of-flight" of pulsed acoustic signals injected into the pipe. The signal, generated in a variety of ways, propagates through the interior of the pipe and is detected by an array of detectors which, in turn generate signals which are processed in a mathematical algorithm to determine the location of the pipe.

2. Description of Prior Art

Reasons for being able to locate buried pipe are numerous and include avoidance of such pipe during excavation projects, attachment of various equipment to the pipe, leak detection and tapping directly into the pipe, especially while it is in service. Numerous methods exist for locating buried metallic pipe which, due to its electrical conductivity, lends itself to processes in which an electromagnetic signal is impressed onto the pipe and the strength of the magnetic field generated by the signal as measured at the surface of the ground is used to determine the location of the pipe. Similar techniques have been applied to plastic pipes which themselves are not electrically conductive but which have been buried with a "tracer wire" alongside, above or near them upon which an electromagnetic signal can be impressed. However, these techniques cannot be applied if the "tracer wire" breaks or otherwise corrodes. Consequently, alternative approaches which do not depend on the material properties of the pipes are required.

U.S. Pat. No. 3,967,282 and U.S. Pat. No. 4,062,010 disclose a process and apparatus for detecting underground pipelines using radar-type signals. U.S. Pat. No. 4,600,356 discloses a pulsed eddy current proximity process and apparatus combined with an excavation device for altering the operator of the device to underground obstructions. U.S. Pat. No. 4,649,948 discloses an apparatus and method for installing a Wye device within a pressurized pipe for inserting a probe into the pressurized pipe for detecting leaks in underground pipelines.

Another approach is the use of acoustics. Applications of acoustical signals to buried pipe are well known to those skilled in the art. Methods for detecting leaks in underground pipelines using acoustic signals are taught by U.S. Pat. No. 3,055,209; U.S. Pat. No. 3,170,152; U.S. Pat. No. 3,264,864; and U.S. Pat. No. 4,013,905. Generally, these methods involve generation of an acoustic signal at a point within a pipeline, detecting the signal at another point in the pipeline and analyzing the differences in the signal between the point at which it is generated and the point at which it is detected to determine the location of the leak. U.S. Pat. No. 4,172,382 discloses a method and apparatus for detecting leaks in buried pipelines by injecting an acoustic signal into the pipeline and, using a laser interferometer system, measuring the time varying displacements of the earth's surface which are propagated at the site of the leak. U.S. Pat. No. 4,858,462 discloses a method and apparatus for locating a leak in a medium such as a steam, gas or liquid pipeline. The apparatus requires a pair of spaced apart piezoelectric transducers which are mechanically coupled to the surface of the pipeline and between which is located a leak. A pressurized leak in the pipeline generates acoustic emissions which propagate along the surface of the pipeline. The emissions are detected by the piezoelectric transducers. By measuring the differences in arrival times of spikes in the acoustic emission at the piezoelectric transducers, the location of the leak can be determined. U.S. Pat. No. 4,457,163 discloses a method and apparatus for locating pipeline damage and medium leak therefrom by acoustically monitoring the soil above the pipe and determining the location of the loudest signal. Japanese Patent 0238733 discloses a method of determining water leakage in an underground water pipe by measuring the phase difference between a sound wave introduced through a branched pipe of a ground level branch of an underground water pipe and the sound wave received at a remote location on the surface of the earth.

The use of acoustic signals to detect the location of underground pipes is also known to those skilled in the art. U.S. Pat. No. 4,911,012 discloses a system for detecting the location of an underground sewer by introducing an identifiable, for example, pulsed acoustic signal into the sewer line at an accessible location and transmitting the signal through the sewer along the underground portion of the sewer line and sensing the signal from the surface at a remote location. The system utilizes a single detector and relies merely on sensing the amplitude of the acoustic signal to determine the sewer line location. Measurement of the amplitude of the acoustic signal is suitable for determining the general location, that is, within a few feet, of the underground pipe. However, it is not suitable for precise location, that is, within a few inches, of the underground pipe as required by most pipe location applications due to complex acoustic ground boundary effects which can reduce the amplitude of an acoustic signal at ground locations above the underground pipe. In addition, coupling of the detector to the ground will vary from placement to placement thereby introducing another uncertainty into the pipe location process, namely, the effect of the variances in coupling on the measured amplitude of the acoustic signal.

SUMMARY OF THE INVENTION

It is an object of this invention to precisely determine the location of concealed or underground pipes, and in particular, underground pipes made of polyethylene or other plastic or non-electrically conductive materials. As used herein, a pipe is any conduit through which a fluid is, or can be, flowed.

It is a further object of this invention to precisely determine the location of underground pipes without excavation therefor.

These objects are achieved by a process in which an identifiable acoustic signal is introduced into an underground pipe, the signal is propagated along the interior of the pipe, the signal is detected, and the "time-of-flight" of the signal from its point of generation to its point of detection is measured and processed in a mathematical algorithm to determine the pipe location. The "time-of-flight" technique of this process is not subject to the problems associated with processes utilizing acoustic signal amplitude measurement as a basis for locating underground pipe.

More specifically, a pulsed acoustic signal of a known frequency is injected into an underground pipe.

An acoustic signal being propagated through the ground is rapidly attenuated in the ground. In addition, an acoustic signal propagated along the interior of an underground pipe travels substantially faster than an acoustic signal propagated through the ground. Accordingly, the first and strongest acoustic signal received by a signal detector in accordance with the process of this invention is the acoustic signal which travels the shortest distance in the ground between the underground pipe and the signal detector. A pulsed acoustic signal enhances the ability of the signal detector to distinguish between the signal injected into the underground pipe and spurious signals derived from the injected signal as the spurious signals are fully attenuated in the ground in the time period between pulses. If the general direction of the pipe from the point of acoustic signal injection is not known, it can be determined relatively easily by methodically moving a signal detector in a circle around the injection point, where the center of the circle is the injection point and the radius of the circle is a few feet. The location of the points along the circumference of the circle where the amplitude of the acoustic signal measured by the detector is the greatest represents the general direction of the pipe from the point of acoustic signal injection. An array of signal detectors is positioned on the ground in a line generally perpendicular to the pipe. When the acoustic signal is detected by the detector, the detector generates an electrical voltage which is fed into a signal processor. By measuring the time delay between signal generation and signal detection at each detector in the array, on the basis that the shorter the time delay the closer the detector is to the pipe, the location of the pipe can be precisely determined.

Many factors, including the physical conditions of the site at which determination of pipe location is desired, pipe dimensions and the degree of precision required in locating the pipe, affect the operation of this invention. Thus, the manner of injecting the acoustic signal, the characteristics of the acoustic signal, and the manner of detecting the signal will vary accordingly.

In one embodiment of this invention, the acoustic signal is injected into the pipe by placing a loudspeaker in an end of a service line of the pipe. In another embodiment of this invention, the acoustic signal is injected into the pipe by attaching a shaker to a service line or main pipe, a riser, a stake pounded into the ground near the pipe or placing the shaker directly on the ground. In still another embodiment of this invention, the acoustic signal is injected into the pipe by mounting shakers in a geometric array which is time-phased to focus sound at the pipe or is compression-wave maximized in a circular array. In yet another embodiment of this invention, the acoustic signal is injected into the pipe by mounting a loudspeaker on a robot inside of the pipe. In still another embodiment of this invention, the acoustic signal is injected into the pipe by using a pressure regulator whose diaphragm is driven with a speaker or a vibrator.

To determine the frequencies most suitable for a particular site, the frequency of the acoustic signal is systematically varied from low to high or high to low and the amplitudes of the output voltages from the detector array are measured. Those frequencies which generate the highest amplitudes are most suitable for use in this invention at the particular site at which location of a buried pipe is sought. Usually, several frequencies will be selected - low frequencies for better wave propagation and general pipe location and higher frequencies for more precise pipe location.

In one embodiment of this invention, the acoustic signal is detected with a surface sensor or array of surface sensors positioned on the ground. In another embodiment of this invention, the acoustic signal is detected using sensors coupled to stakes pounded into the ground. In still another embodiment of this invention, the acoustic signal is detected using accelerometers or geophones.

BRIEF DESCRIPTION OF THE DRAWINGS

The above and other objects, advantages and features of this invention will be more readily understood and appreciated from the description together with the drawings wherein:

FIG. 1 is a schematic diagram of the process of this invention.

DESCRIPTION OF PREFERRED EMBODIMENTS

The operation of the process of this invention will be better understood from a description of the process in conjunction with FIG. 1. In accordance with one embodiment of this invention, acoustic signal 6 is generated by audio speaker 3 or other suitable sound generating means positioned at an open end of pipe 2, preferably an aboveground open end as shown in FIG. 1. Acoustic signal 6 is injected directly into a fluid stream within pipe 2. Acoustic signal 6 propagates along the inside of pipe 2 at the speed of sound, relative to the fluid conditions, in the fluid stream. Acoustic signal 6 comprises two components, a frequency preferably ranging from a low of about 100 Hz to a high of about 5,000 Hz and a duration of about two to about ten wavelengths of a sine wave of the frequency. On this basis, acoustic signal 6 is repeated, or pulsed, about once every second. It will be apparent to those skilled in the art that frequencies outside the preferred range of 100 Hz to 5000 Hz may also be used, but, under most site conditions, the effectiveness of the invention will be reduced.

Acoustic signal 6 is propagated along the inside of pipe 2, through the wall of pipe 2 and through the ground where it is detected by an array of detectors 4a-4h positioned in a line approximately 12 feet long and approximately perpendicular to pipe 2. The number of detectors 4a-4h in an array may be even or odd. In a preferred embodiment of this invention, detectors 4a-4h comprise accelerometers mounted on stakes pushed into the ground. The distance of detectors 4a-4h from audio speaker 3 is governed by the degree of dissipation of acoustic signal 6 into the fluid stream as it propagates along the inside of pipe 2. As a practical matter, in most embodiments of this invention, the distance of detectors 4a-4h from audio speaker 3 is no more than about 2500 feet. When acoustic signal 6 reaches detectors 4a-4h, detectors 4a-4h produce output voltages which vary with time, detectors 4d,4e which are closer to pipe 2 generating an output voltage before detectors 4a,4h which are further from pipe 2. The voltages generated by detectors 4a-4h are amplified, filtered and fed into signal processor 5.

In the process of this invention in accordance with one embodiment of this invention, audio speaker 3 is driven to produce acoustic signal 6 having systematically varying frequencies ranging from a low of about 100 Hz to a high of about 5,000 Hz. The frequencies are detected by detectors 4a-4h and the resulting voltages from detectors 4a-4h are fed into signal processor 5 and a Fast Fourier Transform frequency analysis performed. In this analysis, amplitudes of the different frequency components are examined for each detector 4a-4h. Several frequencies to which detectors 4a-4h respond strongly for the particular site at which location of the pipe is being sought are selected. Detectors 4a,4h positioned far from pipe 2 detect little or no acoustic signal 6 from pipe 2 while detectors 4d,4e positioned close to pipe 2 detect most of acoustic signal 6. In this way, a general location of pipe 2 can be determined.

To precisely locate pipe 2, audio speaker 3 is driven to produce short bursts, or pulses, of acoustic signal 6 at frequencies to which all of detectors 4a-4h have been previously determined to respond. A timer in signal processor 5 is started when the pulse of acoustic signal 6 is generated by audio speaker 3. The voltages generated by detectors 4a-4h upon detection of the pulse of acoustic signal 6 are fed into signal processor 5 in which they are sum-averaged. Sum-averaging is a technique known to those skilled in the art by which background noise which is detected by detectors 4a-4h is de-emphasized in relation to acoustic signal 6, thereby effectively separating acoustic signal 6 from the background noise. Time gating, another technique known to those skilled in the art for deemphasizing background noise relative to an acoustic signal, may be used in addition to sum-averaging. Time gating involves interrupting detection of acoustic signal 6 when the level of acoustic signal 6 plus any background noise which may be present exceeds a predetermined threshold and resuming detection of acoustic signal 6 when the background noise is no longer present. Consequently, the time delay between the time of generation of the pulse of acoustic signal 6 by audio speaker 3 and detection of the pulse of acoustic signal 6 at each detector 4a-4h is readily measured. This time delay is the "time of flight" of acoustic signal 6. Depending on the proximity of detectors 4a-4h to pipe 2, the "time of flight" will vary. The shorter the "time of flight," the closer each of detectors 4a-4h is to pipe 2. Detector 4a-4h having the shortest "time of flight" is closest to pipe 2. In this manner, pipe 2 can be precisely located.

An important feature of the process of this invention is that, although the embodiment of this invention shown in FIG. 1 shows multiple detectors 4a-4h of acoustic signal 6, another embodiment in which only one of detectors 4a-4h is utilized will achieve the same result, the primary difference being that detector 4a-4h must be moved after the "time of arrival" of acoustic signal 6 at a given position of detector 4a-4h has been determined. The closer detector 4a-4h is moved to pipe 2, the shorter will be the "time of arrival." The process of this embodiment will be more time consuming than embodiments utilizing multiple detectors 4a-4h, but it will be equally effective in precisely determining the location of the buried pipe.

Although eight detectors 4a-4h are shown in FIG. 1 and described in the embodiment of this invention having multiple detectors, it is apparent that any other number of detectors can be used to accomplish the results of this invention. It is also apparent that, although the above description of this invention is focussed on locating underground pipe, the method of this invention can be applied to any concealed pipe.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. An acoustic method for locating a concealed pipe comprising:

generating an identifiable acoustic signal;

injecting said identifiable acoustic signal into said concealed pipe;

detecting said identifiable acoustic signal with detectors positioned on a ground linearly approximately perpendicular to said concealed pipe;

measuring a time period between an injection and a detection of said identifiable acoustic signal; and processing said time period in a mathematical algorithm to determine a location of said concealed pipe.

2. An acoustic method in accordance with claim 1, wherein said identifiable acoustic signal is generated by one of a loudspeaker, a shaker and a pressure regulator diaphragm.

3. An acoustic method in accordance with claim 2, wherein said identifiable acoustic signal is detected by one of a surface sensor, a sensor coupled to a stake in said ground, an accelerometer and a geophone.

4. An acoustic method in accordance with claim 1, wherein said identifiable acoustic signal comprises between about two wavelengths and about ten wavelengths of a sine wave at a frequency, and said identifiable acoustic signal is repeated at a rate of about one time per second.

5. An acoustic method in accordance with claim 4, wherein said frequency is in a range of about 100 Hz to about 5000 Hz.

6. An acoustic method in accordance with claim 1, wherein at least one of said detectors is used to detect said identifiable acoustic signal.

7. An apparatus for detecting concealed pipe comprising:

signal generation means for generating an identifiable acoustic signal within said concealed pipe;

detection means for detecting said identifiable acoustic signal;

time measurement means for measuring a time delay between generation of said identifiable acoustic signal and detection of said identifiable acoustic signal; and processing means for processing said time delay for locating said concealed pipes.

8. An apparatus in accordance with claim 7, wherein said signal generation means is one of a loudspeaker, a shaker and a pressure regulator diaphragm.

9. An apparatus in accordance with claim 7, wherein said detection means is one of a surface sensor, a sensor coupled to a stake in a ground, an accelerometer and a geophone.

* * * * *